(12) United States Patent
Spangler (10) Patent No.: US 9,644,172 B2
(45) Date of Patent: May 9, 2017

(54) PATTERNED CANDLE WICK

(71) Applicant: Smith Mountain Industries, Inc., Forest, VA (US)

(72) Inventor: Mark A. Spangler, Bedford, VA (US)

(73) Assignee: Smith Mountain Industries, Inc., Forest, VA (US)

(*) Notice: Subject to any disclaimer, the term of this patent is extended or adjusted under 35 U.S.C. 154(b) by 125 days.

(21) Appl. No.: 13/715,501

(22) Filed: Dec. 14, 2012

(65) Prior Publication Data
US 2013/0157207 A1 Jun. 20, 2013

Related U.S. Application Data

(60) Provisional application No. 61/570,447, filed on Dec. 14, 2011.

(51) Int. Cl.
*C11C 5/00* (2006.01)
*F23D 3/08* (2006.01)

(52) U.S. Cl.
CPC ............ *C11C 5/006* (2013.01); *F23D 3/08* (2013.01)

(58) Field of Classification Search
CPC ............ F23D 3/18; C11C 5/002; F21V 35/00
USPC .................................. 431/325, 289
See application file for complete search history.

(56) References Cited

U.S. PATENT DOCUMENTS

| | | | |
|---|---|---|---|
| 2,279,354 A * | 4/1942 | Walters | F21V 37/00 139/413 |
| 3,428,409 A * | 2/1969 | Summers | 431/289 |
| 4,530,665 A * | 7/1985 | Colonel | D05C 17/00 112/439 |
| 4,652,235 A * | 3/1987 | Yamaguchi | 431/325 |
| 2004/0009447 A1 * | 1/2004 | Decker | 431/288 |
| 2006/0172242 A1 * | 8/2006 | Collard | 431/289 |
| 2007/0248922 A1 * | 10/2007 | Mahdavieh | 431/291 |
| 2011/0024945 A1 | 2/2011 | Decker | |
| 2012/0264069 A1 | 10/2012 | Ramirez | |

FOREIGN PATENT DOCUMENTS

| | | |
|---|---|---|
| CN | 85105677 A | 10/1986 |
| CN | 201485439 U | 5/2010 |
| DE | 20 2007 012159 | 1/2009 |
| WO | WO 02/099022 | 12/2002 |
| WO | WO 2012/145380 | 10/2012 |

OTHER PUBLICATIONS

International Search Report and Written Opinion dated May 21, 2013 for Application No. PCT/US2012/069858.
English Machine Translation of German Patent Application No. DE 20 2007 012159.
Australian Office Action dated Aug. 17, 2015 for Application No. AU 2012351979, 4 pgs.
Chinese Office Action dated Jul. 30, 2015 for Application No. CN 201280061703.4, 11 pgs.

* cited by examiner

*Primary Examiner* — Avinash Savani
*Assistant Examiner* — Rabeeul Zuberi
(74) *Attorney, Agent, or Firm* — Frost Brown Todd LLC (57) ABSTRACT

A substantially planar wick is formed with a two- or three-dimensional pattern. The contours of this pattern are determined by the desired flame characteristics or the desired visual aesthetics of the pattern itself.

6 Claims, 12 Drawing Sheets

PATTERNED CANDLE WICK

BACKGROUND

The candle wick of the present application is a substantially planar wick formed with a two- or three-dimensional pattern. The contours of this pattern are determined by the desired flame characteristics or the desired visual aesthetics of the pattern itself.

DETAILED DESCRIPTION

Figure 1:
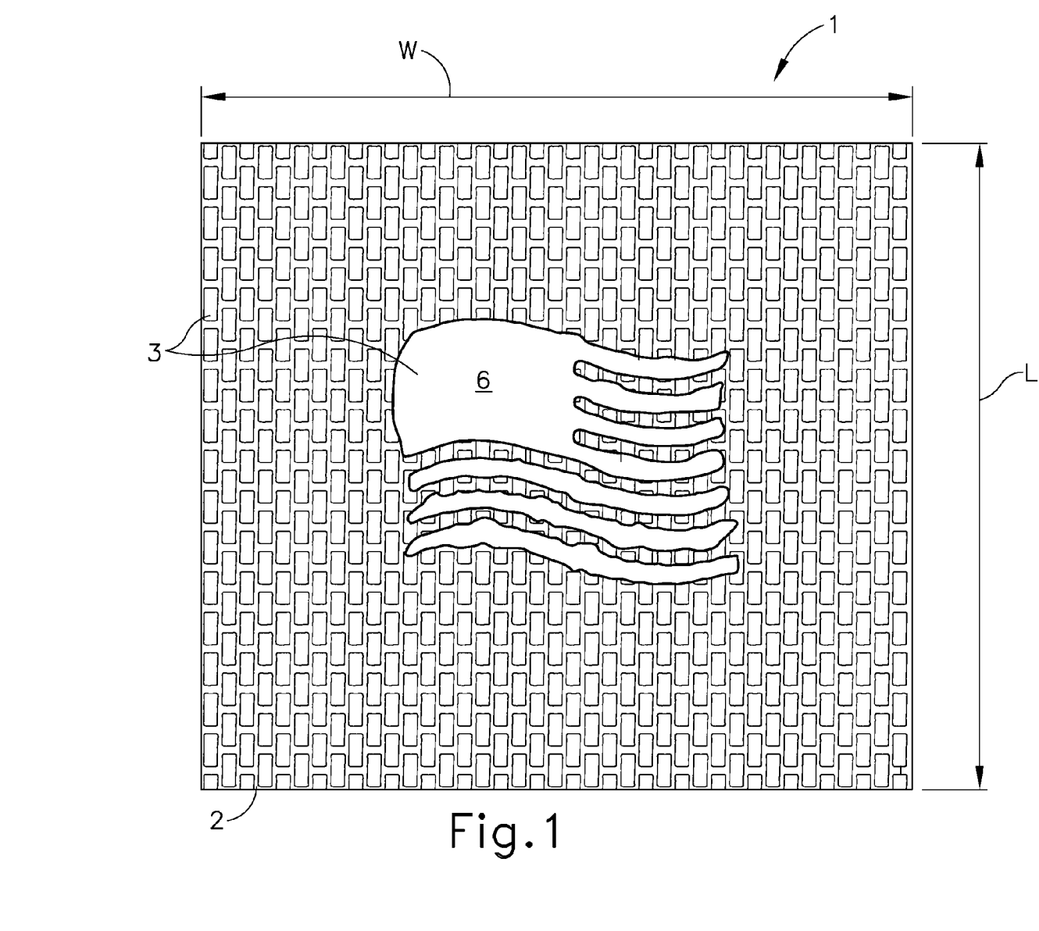
FIG. 1 is a front view of one embodiment of a patterned wick.
Figure 2:
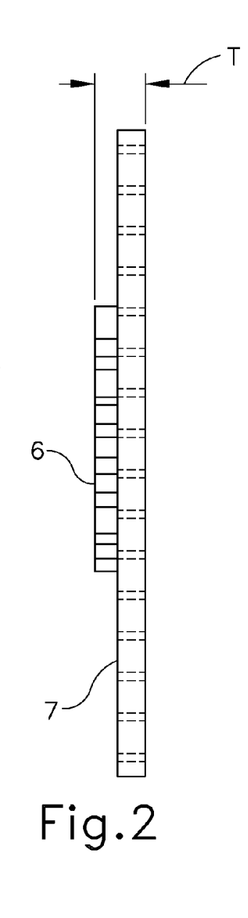
FIG. 2 is a cross-sectional view of the patterned wick of FIG. 1.

Planar candles wick are well-known in the art of candle making. As shown in FIG. 1, a "planar" wick is one which has a surface with a width "W" sufficient to form a pattern along the surface. This surface need not be flat or without contours. In fact, the planar wick may be formed into any shape known in the art. Planar wicks can include wicks such as those disclosed in U.S. patent application Ser. No. 13/449,886, entitled Flexible Wick, filed on Apr. 18, 2012, the disclosure of which is incorporated herein by reference. Planar wicks, as shown in FIG. 2, have a thickness "T" that is perpendicular to the width. As shown in FIG. 1, they also have a length "L" that is perpendicular to both the width and thickness.

A patterned candle wick (1) can be made of any material (2) known in the art for making candle wicks. It can be made by any method known in the art to make planar candle wicks. The patterned wick (1) can be made of wood, paper, textiles, combinations of any of these materials, and any other material that is itself flammable and has the ability to transport melted wax or other fuel toward the candle flame to be burned. A patterned wick (1) can control the amount of fuel carried to the flame because, in general, the more wick material (2) present in the patterned wick, the more fuel provided to the flame and the larger the resulting flame.

Figure 3:
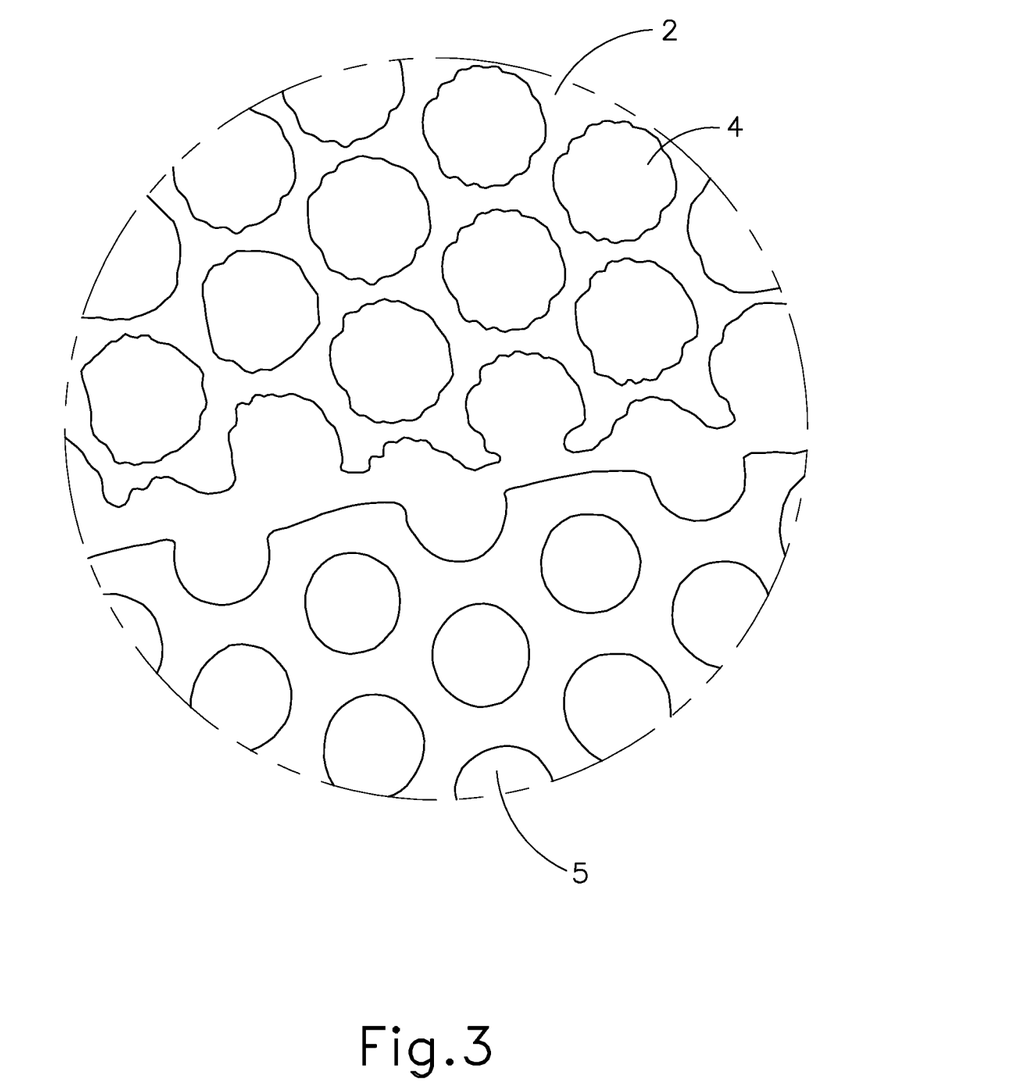
FIG. 3 is a partial, enlarged view of two embodiments of patterned wicks.

The pattern (3) can be formed in the wick by laser cutting, water jet, other known methods of cutting, punching, perforating, or molding. The pattern can be woven into the wick itself, or introduced by any mechanical or chemical treatment known to produce a pattern in the material of the candle wick. Examples of the comparison of cut-outs created by laser cutting and perforation (5) is shown in FIG. 3.

The pattern can be the same through the thickness of the wick, in which case it is a two-dimensional pattern, or it can vary through the thickness of the wick, in which case it is a three-dimensional pattern. An example of a three dimensional pattern is shown in FIGS. 1 and 2 where the flag portion (6) of the pattern (3) is thicker than the portion with rectangular cut outs (7). The pattern can repeat across the width and length of the wick, or it may vary along the width or the length or both to provide a flame with different characteristics either across its width or along its length or both as the candle burns.

Figure 4:
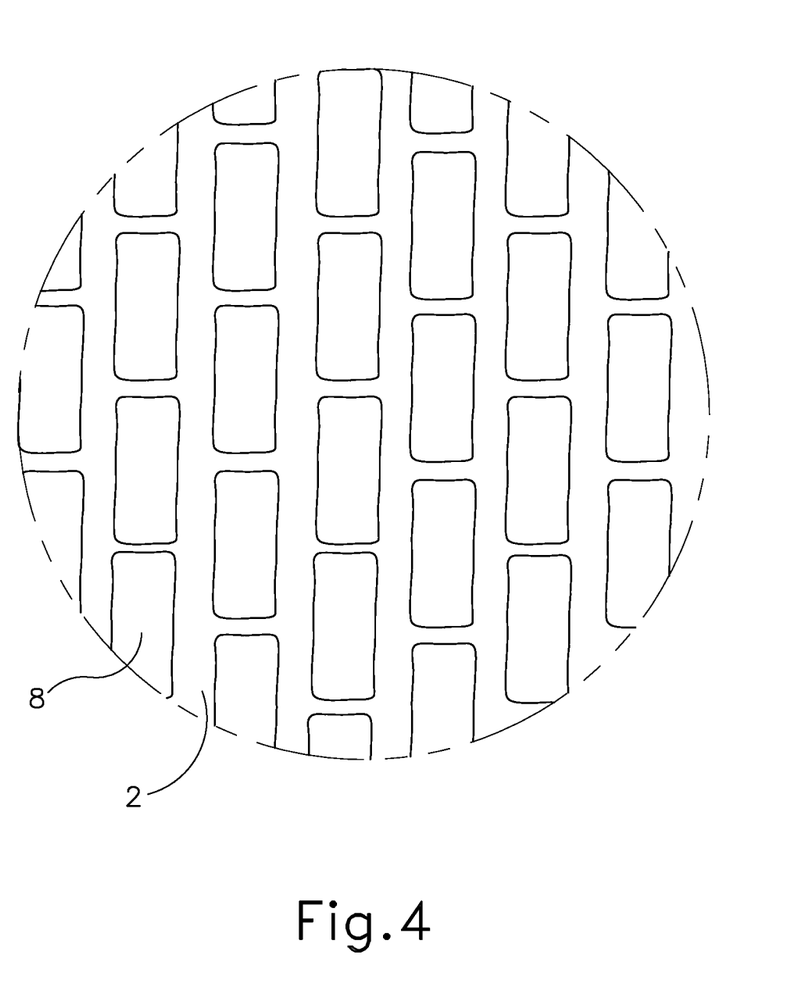
FIG. 4 is a partial, enlarged view of another embodiment of a patterned wick.
Figure 5:
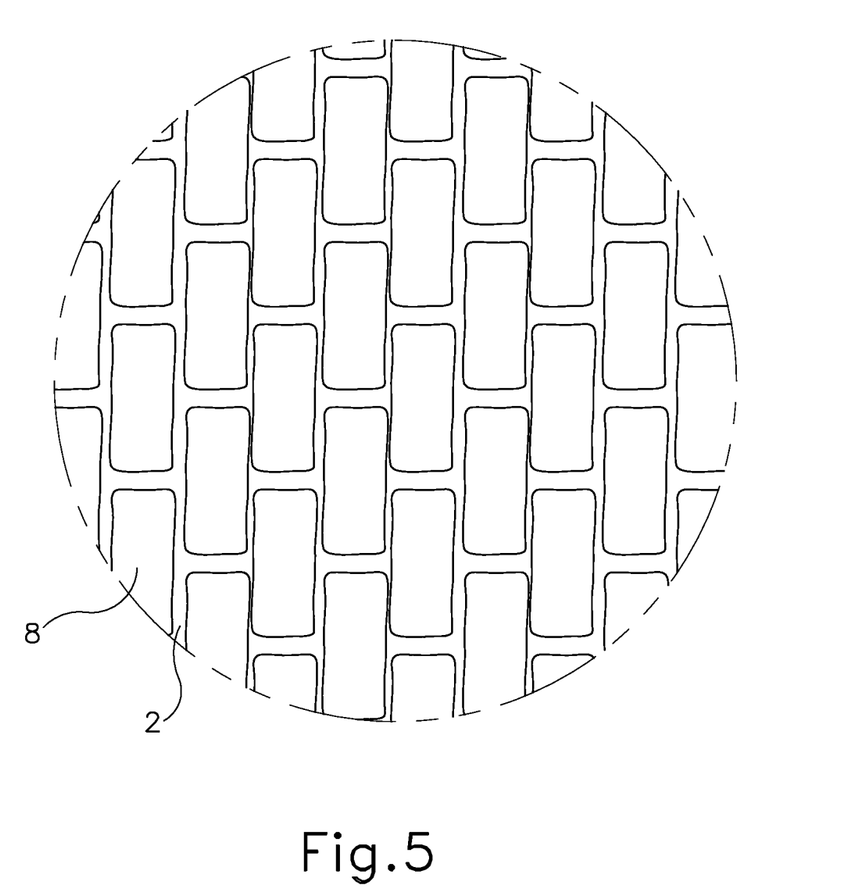
FIG. 5 is a partial, enlarged view of another embodiment of a patterned wick.
Figure 10:
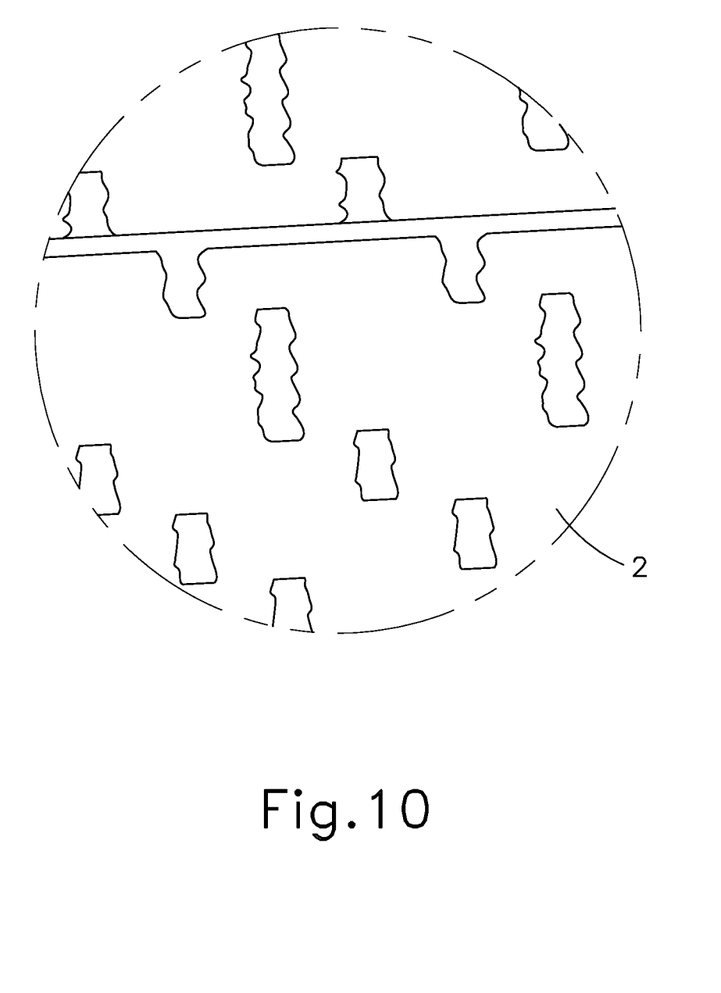
FIG. 10 is a partial, enlarged view of another embodiment of a patterned wick.
Figure 11:
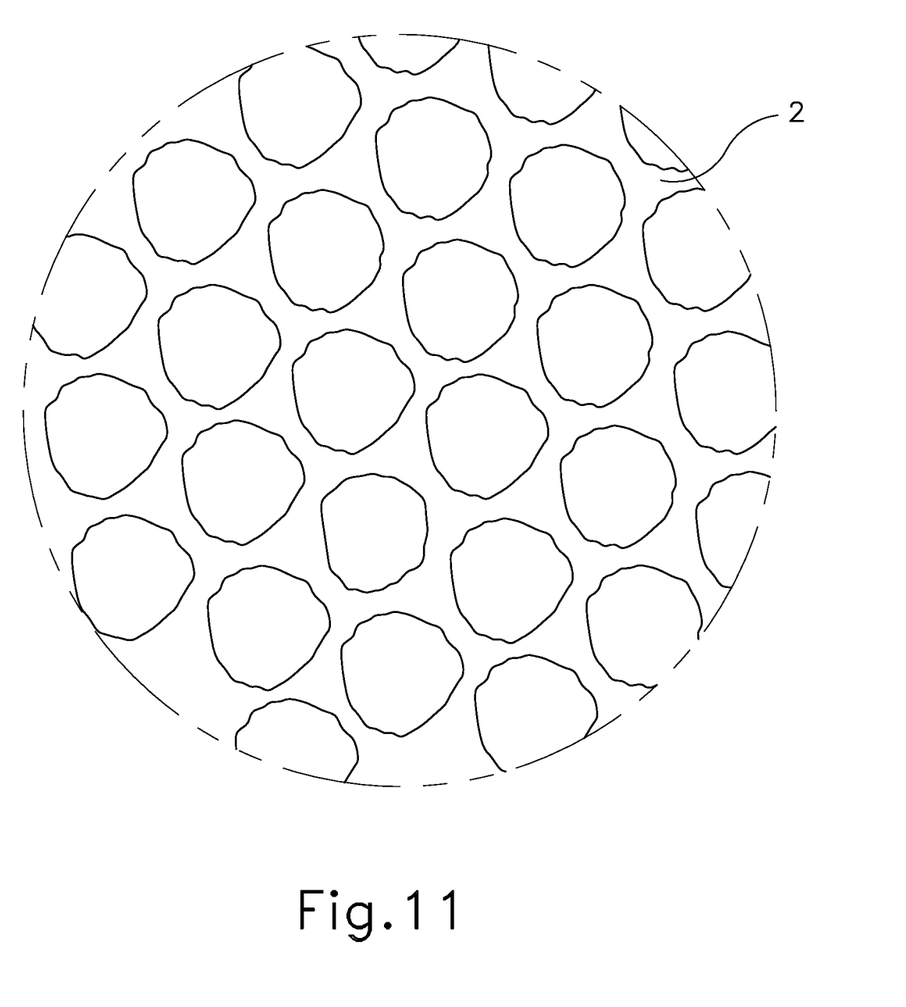
FIG. 11 is a partial, enlarged view of another embodiment of a patterned wick.
Figure 12:
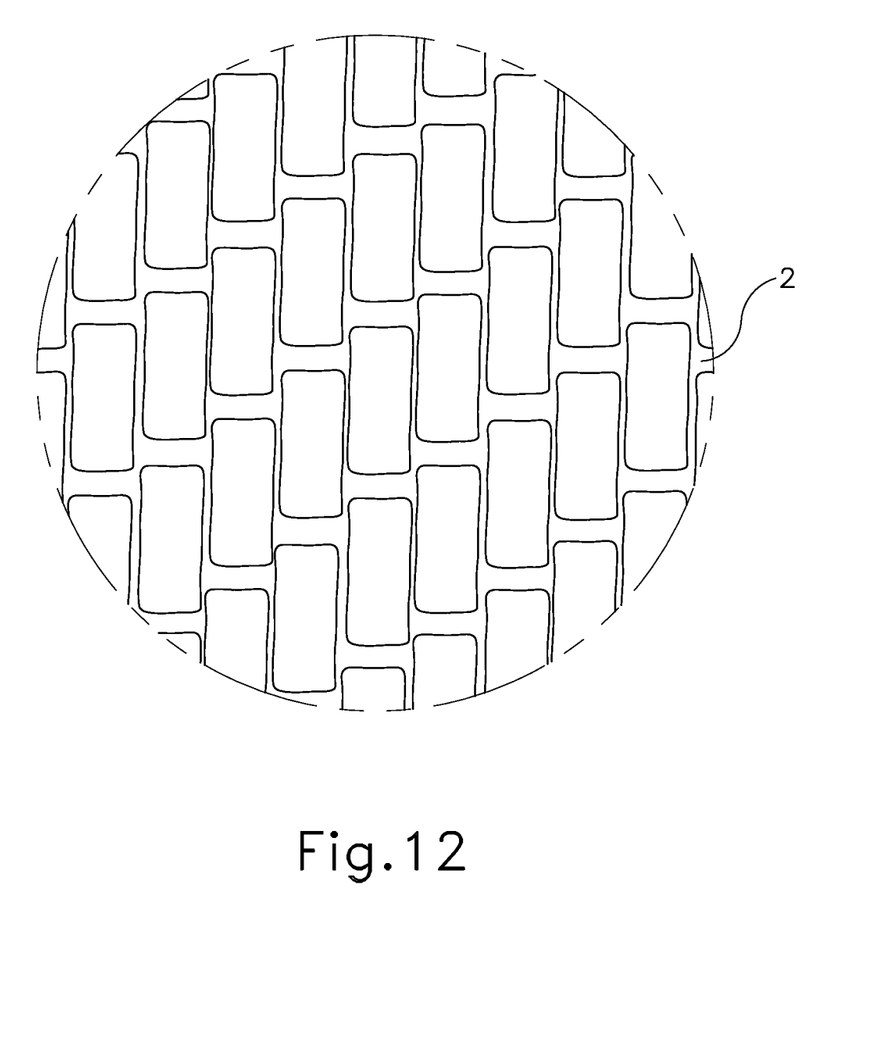
FIG. 12 is a partial, enlarged view of another embodiment of a patterned wick.

In one embodiment, a rectangular pattern can be adjusted by changing the amount of wick material (2) left between cut-outs (8), or the orientation of the cut-outs, or designs, as shown in FIGS. 4 and 5. In this way, the amount of wick material exposed to the flame as well as the amount of wick material carrying fuel to the flame can be adjusted. Adding or subtracting material (2) to the wick will typically produce higher or lower flames. The term "cut-out" is not meant to be limited to an area of wick material that has been removed after the wick was produced. It also refers to any area across the width or thickness or length of the wick where there is no wick material, no matter how that area was formed. Other exemplary patterns are shown in FIGS. 10, 11, and 12.

The type of wick material (2) used in the patterned wick will also affect the flame characteristics that will result from a particular patterned wick. The characteristics of wick material are well-known in the art. In light of this knowledge and the teachings contained herein, one of skill in the art will understand how to achieve the desired flame characteristics.

Figure 6:
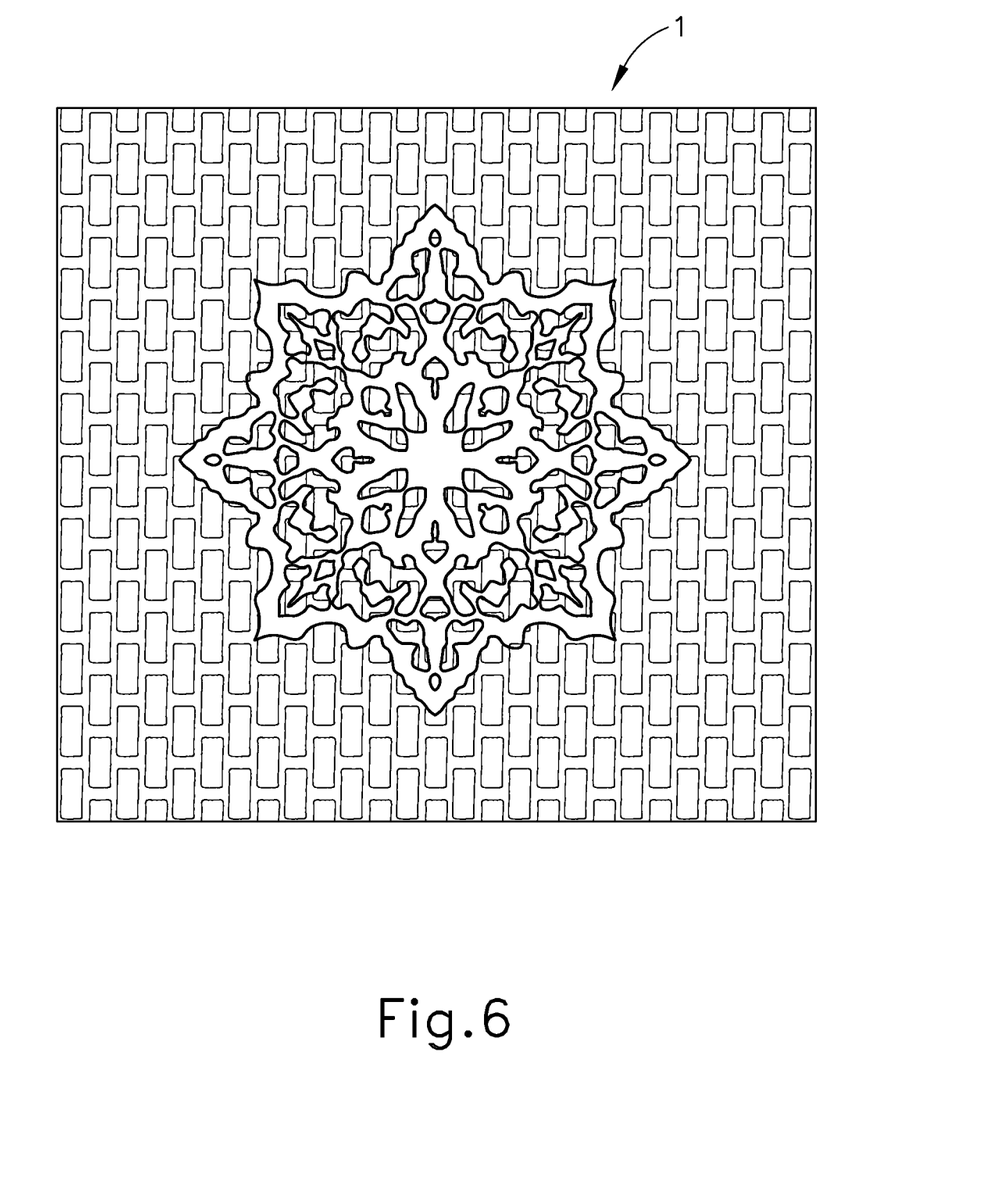
FIG. 6 is a front view of another embodiment of a patterned wick.
Figure 7:
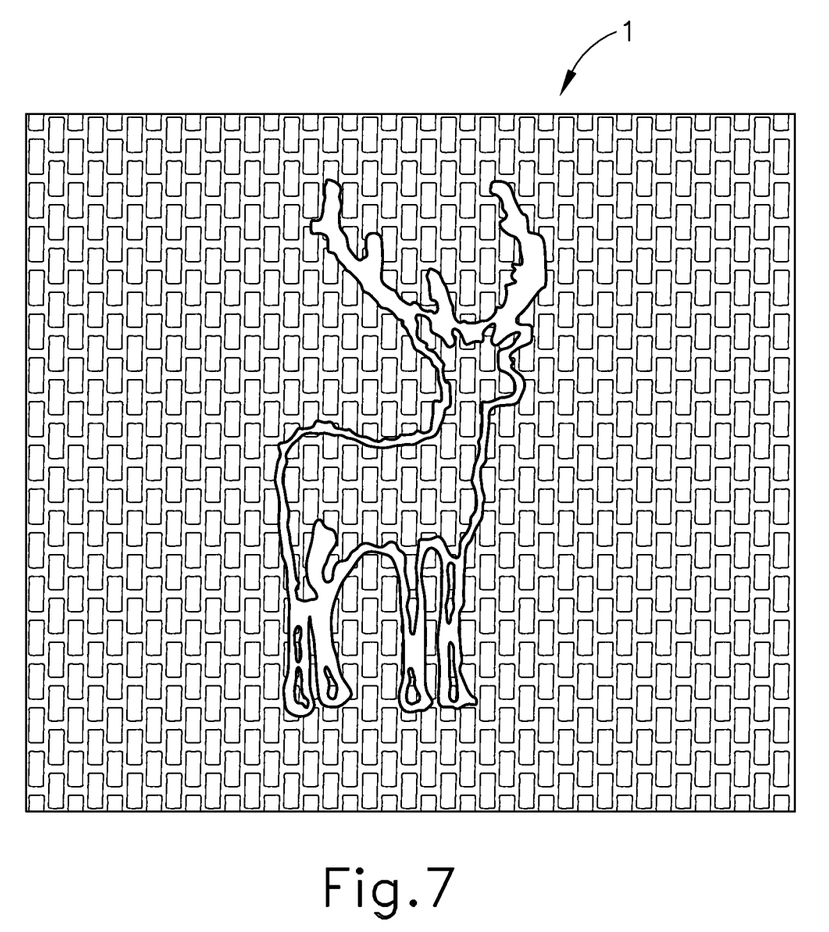
FIG. 7 is a front view of another embodiment of a patterned wick.
Figure 8:
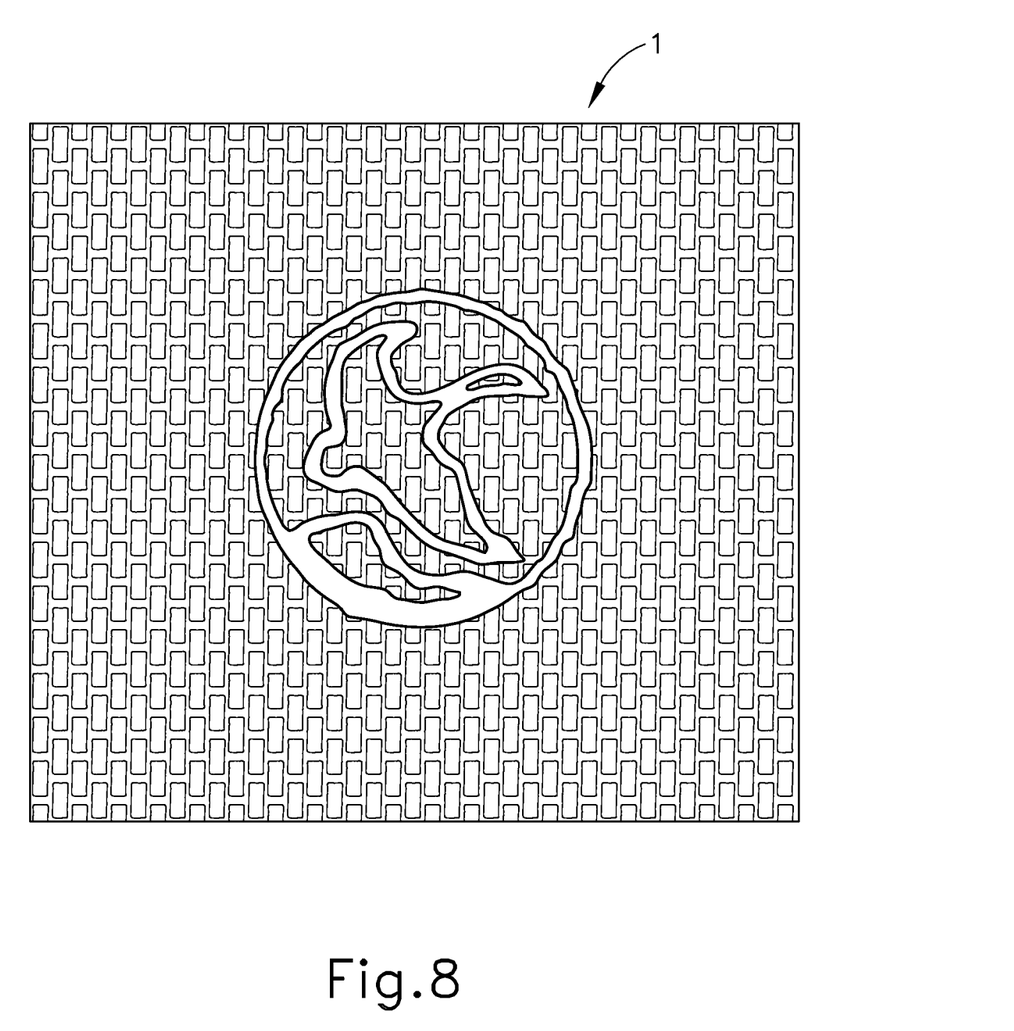
FIG. 8 is a front view of another embodiment of a patterned wick.
Figure 9:
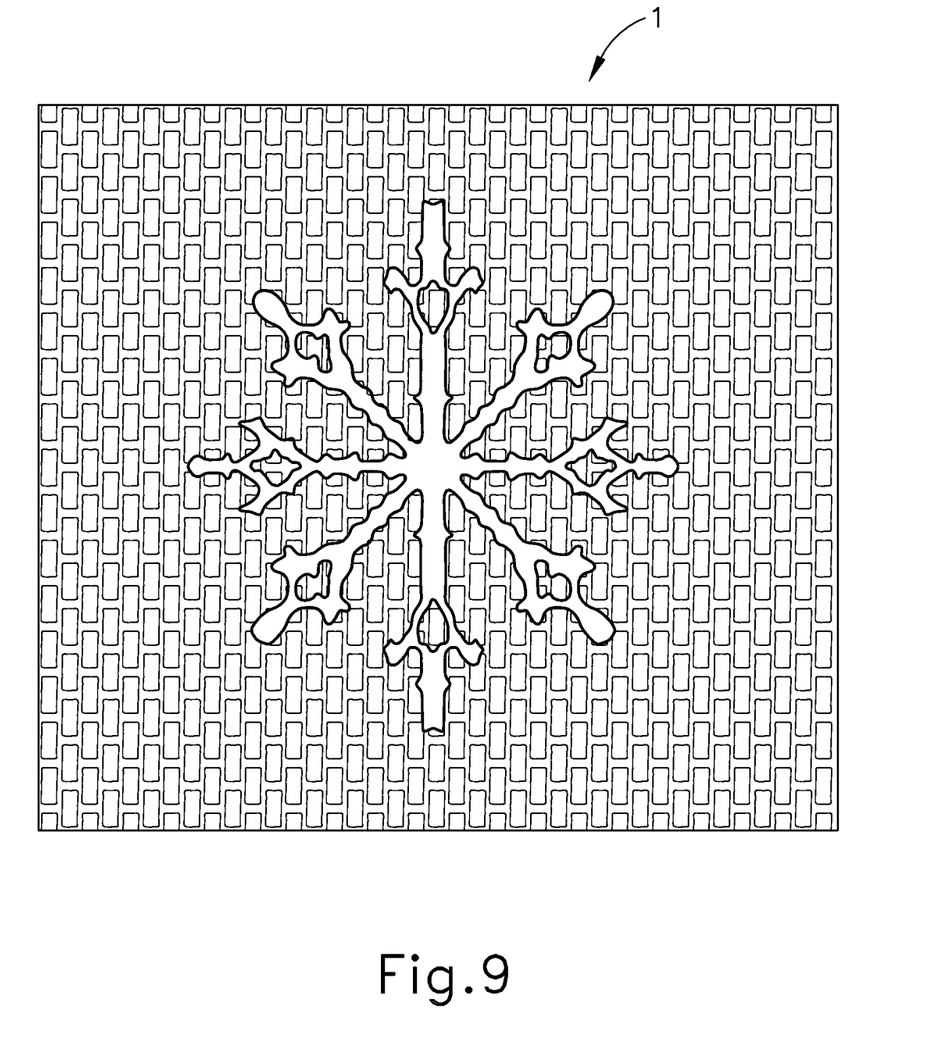
FIG. 9 is front view of another embodiment of a patterned wick.

Particular patterns may also be chosen for their aesthetic appeal. For example, a planar wick with a decorative pattern, such as a flag, (FIG. 1) or a snowflake (FIG. 6) and FIG. 9 or an animal FIGS. 7 and 8 can be produced. Alternatively, a company logo, name, or other mark can also be formed in a patterned wick (1). In the case of such a decorative patterned wick, a gel wax, oil, or other translucent fuel material, which are well-known in the art, may be used in the candle so that the pattern in the wick is visible through the candle. In another variation, a more opaque wax or other fuel may be used with a wick that contains a pattern that is visible above the top surface of the candle. In yet another variation, a more opaque wax or other fuel that becomes translucent or clear upon melting can be used to allow the patterned wick to be viewed while the candle is burning.

Figure 13:
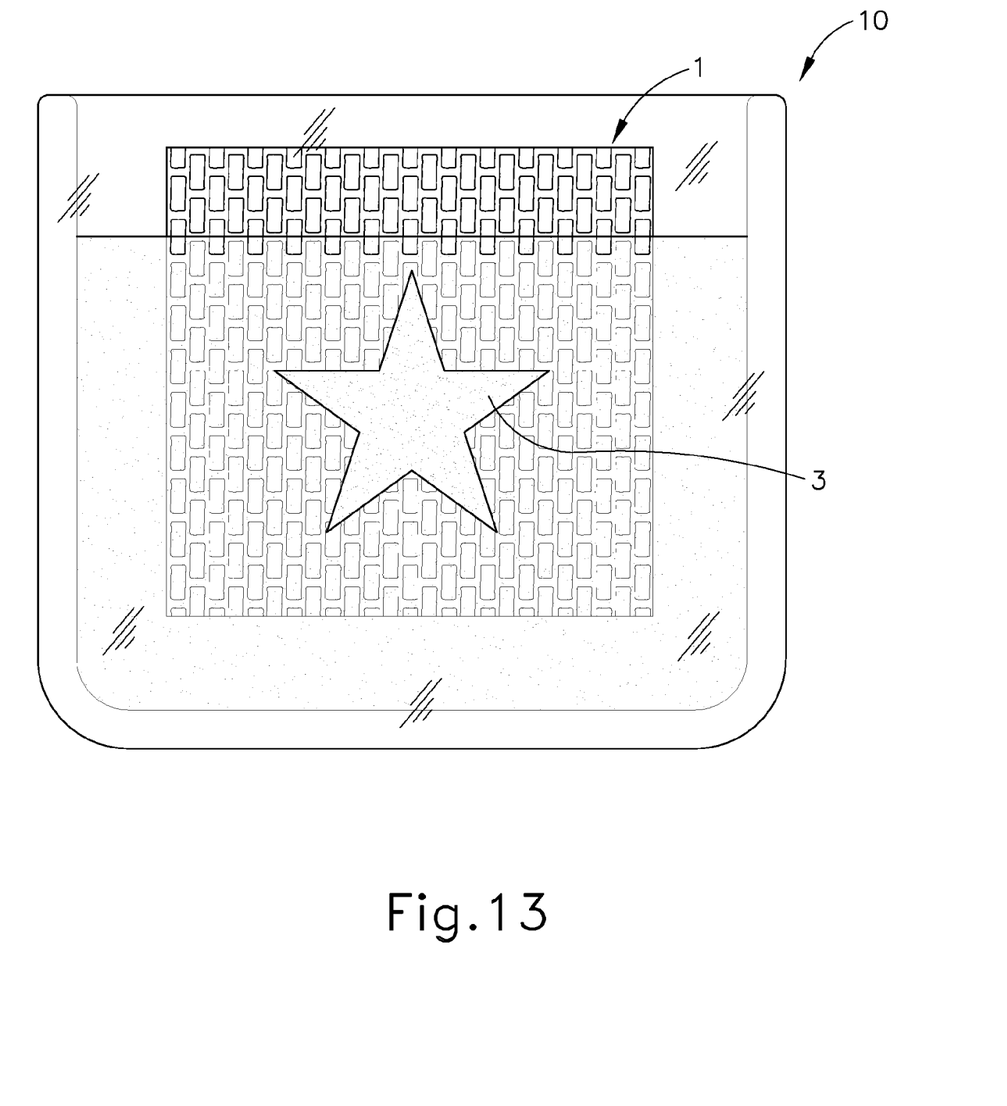
FIG. 13 is a front view of a candle with a patterned wick.

The present candle wick embodiments may be used in any candle configuration. Candles (10) containing the patterned wick (1) can be produced by any methods known in the art for assembling candles with planar wicks. For example, each candle wick (1) can be used in a free-standing candle or in a candle contained within a receiving container (9) as shown in FIG. 13. The receiving container (9) may be, for example, a candle jar. The jar may be made of glass or any other suitable material. The jar may be configured to contain a candle fuel, such as wax.

In one embodiment, a patterned wick has a different pattern at the top of its length than it does at the bottom of its length, which permits a candle to be placed in a tall, thin jar. Without such a patterned wick, a candle wick produces a flame of the same intensity along its entire length. In a tall, thin candle jar, the heat from the flame is less able to escape as the candle burns further into the jar. If the candle flame has the same intensity when it burns towards the bottom of the jar as it had at the top of the jar, it can increase the likelihood that the jar will break as the candle burns down into the jar. In the present embodiment, the wick includes a pattern that allows for more fuel to be carried to the flame at the top of candle and less fuel to be carried to the flame as the candle burns down into the jar.

Example 1

A rectangular pattern, as shown in FIG. 4, was laser cut into a wick made of corrugated cardboard. The wick material between the cut outs was 0.0024" in width.

Example 2

A rectangular pattern, as shown in FIG. 5, was laser cut into a wick made of corrugated cardboard. The wick material between the cut outs was 0.0012" in width.

The wick of example 1 burned hotter than the wick of example 2.

Example 3

A staggered rectangular pattern, as shown in FIG. 1, was laser cut into a wick made of corrugated cardboard.

I claim:

1. A wick comprising wick material, wherein the entire wick material has the ability to transport fuel to a candle flame to be burned, wherein the wick material has sufficient capillary action to deliver fuel to flame, wherein the wick material has a pattern that is formed along a width, a length, and a thickness of the wick material, wherein the pattern is varied through the thickness such that the pattern is three-dimensional, wherein the pattern is configured to provide at least one of a decorative pattern or predetermined flame burn characteristics, wherein the pattern is different in one portion of the wick than it is in a second portion of the wick, wherein the pattern is configured to adjust the amount of wick material carrying fuel to the flame, wherein the wick has a top and a bottom and the pattern is different at the top of the wick than at the bottom of the wick.

2. A wick according to claim 1 wherein the wick material is selected from the group consisting of paper, wood, textiles, or any combination therein.

3. A candle comprising a wick according to claim 1.

4. A candle according to claim 3 further comprising a fuel that is translucent.

5. A candle according to claim 3 further comprising a fuel that is transparent.

6. A candle according to claim 3 wherein the pattern comprises rectangular cut-outs.

* * * * *